(12) United States Patent
Walker et al.

(10) Patent No.: US 11,487,791 B2
(45) Date of Patent: Nov. 1, 2022

(54) LATENT FEATURE EXTRACTION FROM A NETWORK GRAPH

(71) Applicant: Microsoft Technology Licensing, LLC, Redmond, WA (US)

(72) Inventors: Matthew Hsing Hung Walker, Mountain View, CA (US); Myunghwan Kim, Milpitas, CA (US); Yiou Xiao, Sunnyvale, CA (US); Yafei Wang, Sunnyvale, CA (US); Florent Bekerman, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 409 days.

(21) Appl. No.: 16/369,980

(22) Filed: Mar. 29, 2019

(65) Prior Publication Data
US 2020/0311110 A1    Oct. 1, 2020

(51) Int. Cl.
G06F 16/28        (2019.01)
G06N 3/08         (2006.01)
G06F 16/901       (2019.01)

(52) U.S. Cl.
CPC ........ *G06F 16/288* (2019.01); *G06F 16/9024* (2019.01); *G06N 3/08* (2013.01)

(58) Field of Classification Search
CPC ...... G06F 16/288; G06F 16/9024; G06N 3/08
See application file for complete search history.

(56) References Cited

U.S. PATENT DOCUMENTS

| | | | |
|---|---|---|---|
| 2015/0356144 A1* | 12/2015 | Chawla | G06N 5/022 707/741 |
| 2016/0220177 A1* | 8/2016 | Proud | A61B 5/1118 |
| 2016/0307233 A1* | 10/2016 | Pan | H04L 67/306 |
| 2016/0328383 A1* | 11/2016 | Cross, III | G06F 40/211 |
| 2018/0219895 A1* | 8/2018 | Silver | H04L 41/147 |
| 2018/0233151 A1* | 8/2018 | Li | G10L 17/08 |

(Continued)

OTHER PUBLICATIONS

Hamilton, et al., "Inductive Representation Learning on Large Graphs", In Proceeding of 31st Conference on Neural Information Processing Systems, Dec. 2017,19 Pages.

(Continued)

*Primary Examiner* — Ashish Thomas
*Assistant Examiner* — Dustin D Eyers
(74) *Attorney, Agent, or Firm* — NDWE, LLP

(57) ABSTRACT

Techniques for generating latent representations for entities based on a network graph are provided. In one technique, an artificial neural network is trained based on feature vectors of entities and feature vectors of neighbors of those entities. The neighbors are determined based on a graph of nodes representing the entities. Two nodes are connected if, for example, the corresponding entities are connected in an online network, one entity transmitted an online communication to the other entity, or one entity interacted with content associated with the other entity. Once trained, the artificial neural network is used to generate latent representations for entities represented by the graph. Latent representations may be used in multiple ways. For example, a similarity between two latent representations may be used to determine an order of candidate content items to present to an entity corresponding to one of the latent representations.

20 Claims, 4 Drawing Sheets

(56) References Cited

U.S. PATENT DOCUMENTS

2019/0102694 A1* 4/2019 Yates .................. G06N 3/0454
2019/0306306 A1* 10/2019 Makagon ............... G06N 20/00

OTHER PUBLICATIONS

Ying, et al., "Graph Convolutional Neural Networks for Web-Scale Recommender Systems", In Proceedings of the 24th ACM SIGKDD International Conference on Knowledge Discovery & Data Mining, Aug. 19-23, 2018, pp. 974-983.

* cited by examiner

LATENT FEATURE EXTRACTION FROM A NETWORK GRAPH

TECHNICAL FIELD

The present disclosure relates to graph data processing and, more particularly to, extracting latent features for nodes based on connected nodes.

BACKGROUND

Understanding how two entities (e.g., users, organizations) are similar is important in multiple contexts, such as a medical context, a media context, an online network context, and a sales context. Measures of entity similarity may be used in prediction and ranking tasks, such as identifying users that are similar to a particular user for content relevance purposes, or determining whether a notification about one user might be interesting to another user, or how to rank an online news feed for a particular user.

Approaches to calculating how similar two entities are to each include determining a number of common connections between the two entities in a graph (such as an online connection network), determining a number of similarities between profiles of the two entities (e.g., whether the two entities worked at the same company), learning per entity latent features using matrix factorization techniques. However, each of these approaches is deficient in some way.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
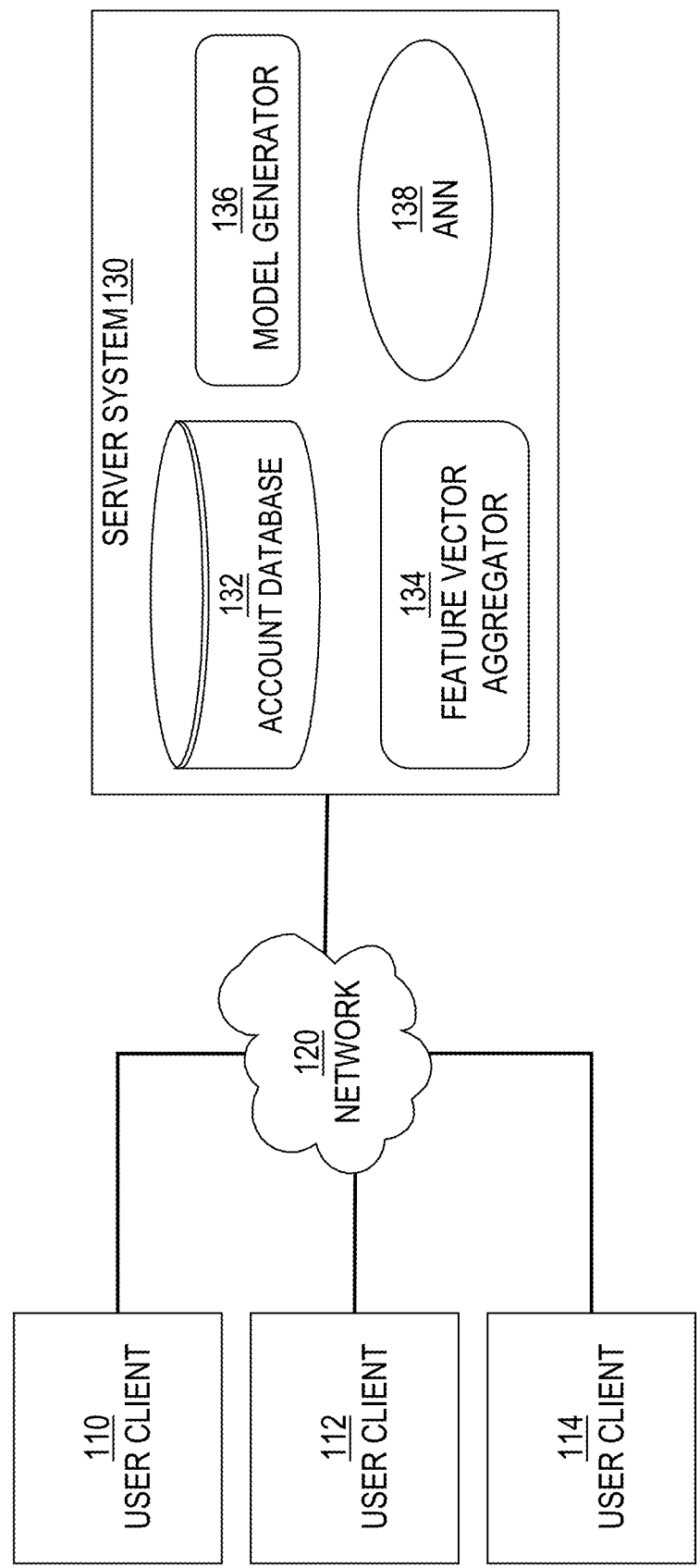
FIG. 1 is a block diagram of an example system for generating latent representations for entities, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for generating latent representations for entities are provided. An entity may be a human user, a group of people, an organization, or a group of organizations and people. A latent representation for a particular entity is based on a feature vector of the particular entity and feature vectors of entities to which the particular entity is connected in a graph. The graph may represent connections in an online network, interactions between entities, or some other affinity between entities. For example, a latent representation for a particular entity is computed by identifying multiple entities connected to the particular entity, retrieving feature vectors of those connected entities (or "neighbors"), combining the feature vectors to generate a neighbor feature vector, and then combining the neighbor feature vector with an existing feature vector for the particular entity to create an aggregated vector for the particular entity. The aggregated vector is input to an artificial neural network (ANN), which outputs a latent representation for the particular entity.

In a related technique, a latent representation for a particular entity is based on entities that are within N degrees of the particular entity in a graph, such as second-degree connections and, optionally, third-degree connections of the particular entity.

Embodiments described herein represent an improvement to computer-related technology. Embodiments include multiple advantages over other approaches for identifying relevant content for an entity. One advantage is that the features that are considered for generating a latent representation of an entity does not need to be hand-crafted, meaning that the features that might be successful does not need to be known in advance. The features are learned automatically. Another advantage is that embodiments takes into account both network and entity-specific information, which is an improvement over approaches that only take into account one type of information.

Other advantages of embodiments include flexibility and scalability over other approaches, such as matrix factorization techniques, which is not scalable. Also, a proxy embedding approach lacks network features. Further, the ANN does not need to be trained over an entire entity base like other approaches might require. This means that latent representations can be calculated for new entities or when connections are added without needing to retain the machine-learned model. Additionally, the ANN is not required to optimize embeddings for a specific prediction task with an unsupervised objective. In other words, the solution is task independent.

System Overview

FIG. 1 is a block diagram of an example system 100 for generating latent representations for entities, in an embodiment. System 100 includes user clients 110-114, network 120, and server system 130.

Each of user clients 110-114 is an application or computing device that is configured to communicate with server system 130 over network 120. Examples of computing devices include a laptop computer, a tablet computer, a smartphone, a desktop computer, and a personal digital assistant (PDA). An example of an application includes a native application that is installed and executed on a local computing device and that is configured to communicate with server system 130 over network 120. Another example of an application is a web application that is downloaded from server system 130 and that executes within a web browser running on a computing device. Each of user clients 110-114 may be implemented in hardware, software, or a combination of hardware and software. Although only three user clients 110-114 are depicted, system 100 may include many more clients that interact with server system 130 over network 120.

Network 120 may be implemented on any medium or mechanism that provides for the exchange of data between user clients 110-114 and server system 130. Examples of network 120 include, without limitation, a network such as a Local Area Network (LAN), Wide Area Network (WAN), Ethernet or the Internet, or one or more terrestrial, satellite or wireless links.

Server system 130 includes an account database 132, feature vector aggregator 134, model generator 136, and artificial neural network (ANN) 138. Although depicted as a single element, server system 130 may comprise multiple computing elements and devices, connected in a local network or distributed regionally or globally across many networks, such as the Internet. Thus, server system 130 may comprise multiple computing elements other than the depicted elements.

Account Database

Account database 132 comprises information about multiples accounts. The account database may be stored on one or more storage devices (persistent and/or volatile) that may reside within the same local network as server system 130 and/or in a network that is remote relative to server system 130. Thus, although depicted as being included in server system 130, each storage device may be either (a) part of server system 130 or (b) accessed by server system 130 over a local network, a wide area network, or the Internet.

In a social networking context, server system 130 is provided by a social network provider, such as LinkedIn, Facebook, or Google+. In this context, each account in the account database includes a user profile, each provided by a different user. A user's profile may include a first name, last name, an email address, residence information, a mailing address, a phone number, one or more educational institutions attended, one or more current and/or previous employers, one or more current and/or previous job titles, a list of skills, a list of endorsements, and/or names or identities of friends, contacts, connections of the user, and derived data that is based on actions that the candidate has taken. Examples of such actions include jobs to which the user has applied, views of job postings, views of company pages, private messages between the user and other users in the user's social network, and public messages that the user posted and that are visible to users outside of the user's social network (but that are registered users/members of the social network provider).

Some data within a user's profile (e.g., work history) may be provided by the user while other data within the user's profile (e.g., skills and endorsement) may be provided by a third party, such as a "friend," connection, colleague of the user.

Server system 130 may prompt users to provide profile information in one of a number of ways. For example, server system 130 may have provided a web page with a text field for one or more of the above-referenced types of information. In response to receiving profile information from a user's device, server system 130 stores the information in an account that is associated with the user and that is associated with credential data that is used to authenticate the user to server system 130 when the user attempts to log into server system 130 at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In an embodiment, server system 130 stores access data in association with a user's account. Access data indicates which users, groups, or devices can access or view the user's profile or portions thereof. For example, first access data for a user's profile indicates that only the user's connections can view the user's personal interests, second access data indicates that confirmed recruiters can view the user's work history, and third access data indicates that anyone can view the user's endorsements and skills.

In an embodiment, some information in a user profile is determined automatically by server system 130 (or another automatic process). For example, a user specifies, in his/her profile, a name of the user's employer. Server system 130 determines, based on the name, where the employer and/or user is located. If the employer has multiple offices, then a location of the user may be inferred based on an IP address associated with the user when the user registered with a social network service (e.g., provided by server system 130) and/or when the user last logged onto the social network service.

While some examples herein are in the context of online networks, embodiments are not so limited.

Feature Vector Aggregator

Feature vector aggregator 134 is a component of server system 130. Feature vector aggregator 134 may be implemented in software, hardware, or any combination of hardware and software. Feature vector aggregator 134 identifies a feature vector for an entity and a feature vector for each of one or more neighbors of the entity (as indicated in a graph) and generates an aggregated feature vector for the entity. A neighbor may be a first-degree neighbor, a second-degree neighbor, and/or a neighbor of another degree. Feature vector aggregator 134 may generate a feature vector for an entity or a neighbor based on information in account database 132. Alternatively, a feature vector for an entity or a neighbor may already have been generated previously.

A feature vector of an entity may comprise a combination of latent representations of features of the particular entity and non-latent features of the particular entity. For example, a latent representation of a particular job title may have been learned/generated previously while organizations (e.g., companies, government agencies, charitable organizations, non-profit organizations, trade associations, etc.) are not associated with latent representations. Instead, for example, a hot encoding may be used for a particular organization.

For example, if there are three possible industries, then each hot encoding for the industry attribute is three values in length. For example, if the industries are Technology, Food, and Retail, then a hot encoding for Technology may be $\{1, 0, 0\}$, a hot encoding for Food may be $\{0, 1, 0\}$, and a hot encoding for Retail may be $\{0, 0, 1\}$. For the attribute skills, if there are one thousand possible skills, then a hot encoding for each skill is a thousand entries in length and, for each skill, only one of the thousand entries will have a value of 1.

One type of aggregation that feature vector aggregator 134 might perform is summing or averaging feature vectors of multiple neighbors to generate a "neighborhood" feature vector that represents multiple feature vectors. The neighborhood feature vector may be the same size as each individual feature vector upon which the neighborhood feature vector is based.

Feature vector aggregator 134 aggregates or combines the feature vector of the entity with the neighborhood feature vector. For example, feature vector aggregator 134 concatenates the neighborhood feature vector to the end of the feature vector of the entity to generate a combined feature vector for the entity. Feature vector aggregator 134 generates combined feature vectors for multiple entities in this same manner.

Model Generator

Model generator 136 is a component of server system 130. Model generator 136 may be implemented in software, hardware, or any combination of software and hardware. Model generator 136 generates training instances for training a neural network, such as ANN 138. Alternatively, feature vector aggregator 134 (or some other component, not depicted) generates the training instances.

Each training instance comprises a pair of combined feature vectors, each for a different entity. Each training instance also comprises a label indicating whether the two entities are neighbors in the graph.

Model generator 136 trains ANN 138 based on the generated training instances. ANN 138 is a multi-layer network comprises nodes (or "neurons") that are connected to each other in a specific configuration. Each connection between neurons is initially associated with a weight, which may be a randomly-selected value. During the training process, the weights are tuned or adjusted in order to minimize an error.

Once the ANN 138 is trained, feature vector aggregator 134 may generate combined feature vectors for different entities and input those combined feature vectors into ANN 138 to generate latent representations for the different entities. Thereafter, latent representations for different entities may be used in different ways, as described in more detail herein.

In an embodiment, different ANNs are trained, validated, and used. For example, one ANN may be trained for entities residing in (or associated with) North America while another ANN may be trained for entities residing in South America. As another example, one ANN may be trained for entities associated with one job industry (e.g., Technology) while another ANN may be trained for entities associated with another job industry (e.g., Law). Any entity attribute may be a basis for training different ANNs.

In an embodiment, one portion of ANN 138 is applied to neighbor feature vectors before combining the aggregated neighbor feature vectors with a feature vector of the source entity and another portion of ANN 138 is applied after combining the aggregated neighbor feature vector with the feature vector of the source entity. In this embodiment, the training data comprises the inputs for the source entity and the inputs of the source entity's neighbors, non-aggregated. In this way, ANN 138 may be visualized as being part of feature vector aggregator 134, not separate therefrom.

Embeddings

A latent representation of an entity is a set of values that represents the entity. In an embodiment, a latent representation is an embedding, which is a vector of real numbers. An embedding is a mapping of a (e.g., discrete) variable to a vector of continuous numbers. In the context of neural networks, embeddings are low-dimensional, learned continuous vector representations of discrete variables. Neural network embeddings are useful because they can reduce the dimensionality of categorical variables and meaningfully represent categories in the transformed space.

An embedding may be used in one or more ways, such as (1) computing similarities between entities; (2) finding nearest neighbors in the embedding space (which can be used to make recommendations based on user interests or cluster categories); (3) as input to a machine learning model for a supervised task; and (4) for visualization of concepts and relations between categories.

In the context of linguistics, word embedding, when used as the underlying input representation, has been shown to boost performance in natural language processing (NLP) tasks, such as syntactic parsing and sentiment analysis. Word embedding aims to quantify and categorize semantic similarities between linguistic items based on their distributional properties in large samples of language data. The underlying idea that a word is characterized by "the company it keeps."

In an embodiment, in the context of determining similarities between entities, a latent representation (or embedding) is determined (e.g., learned) for each of multiple entities. An embedding for an entity may be based on feature vectors of attribute values of the entity. Such attribute values may be string values or numeric identifiers. An example entity attribute is employer of an entity, which attribute may be a name (e.g., string of non-numeric characters) of the employer (e.g., "Company X") of the entity or an identifier (e.g., "435256") that uniquely identifies an employer of the entity.

Each type of embedding represents something different. For example, an embedding for a particular employer (which embedding may be used to generate an entity embedding) may represent behavior of employees of the particular employer. Similarly, an embedding for a particular job title (which embedding may be used to generate an entity embedding) represents behavior of users with that particular job title (e.g., when responding to selectable content items). As another example, an embedding for a particular geographic region (which embedding may be used to generate an entity embedding) may represent online behavior of entities associated with that geographic region (e.g., towards selectable content items). Similarly, an embedding for a particular skill (which embedding may be used to generate an entity embedding) may represent online behavior of entities associated with that skill (e.g., towards selectable content items). Additionally, embeddings may represent both behaviors and characteristics of entities. For example, an embedding for a job title may represent the skills users with the job title may have.

Graph

In an embodiment, training data that is used to generate or "learn" embeddings for different entities depends on a graph. The graph comprises nodes and edges, each of which connects two nodes. Each node represents an entity. An edge may represent different things depending on the implementation. For example, an edge connecting two nodes may represent that two corresponding entities are connected to each other in an online social network. As another example, an edge connecting two nodes may represent that at least one entity caused an electronic message to be sent to the other entity. As another example, an edge connecting two nodes may represent that at least one entity interacted with (e.g., "liked", clicked on, commented on, shared) (a) content that was authored by the other entity or (b) content with which the other entity also interacted.

The graph may be un-directed or directed. For example, in a connection graph, a connection between two entities is not directed. In a directed graph, a first node is connected to and points to a second node if the entity of the first node sent a message to, or interacted with content associated with (e.g., authored by), an entity of the second node. Thus, edges in such a graph are directed.

In an embodiment, edges are weighted. For example, an edge may be weighted by the number of online interactions between two entities. The edge weight may be used as a label in the training instances. For example, a label of '1' (indicating a connection between two entities in a graph) may be replaced with a weight of the corresponding edge.

It would be nice if we could add a variant where the edges are weighted as well (for instance by the number of interactions), and the edge weight would be used as the label in the training instances (so we'd replace the 1 by the weights.

Feature Vectors

A feature vector for an entity may be based on one or more latent representations (or embeddings) of attributes of the entity, such as one or more current and/or past employers of the entity, one or more academic schools that the entity attended, one or more job titles of the entity, one or more skills of the entity, and/or one or more industries of the entity. Values of such may be determined from the entity's profile in a profile database. Latent representations (or embeddings) of such attribute values (or of identifiers that uniquely identify the respective attribute values) may have been machine learned previously. Additionally or alternatively, a feature vector for an entity may be based on non-latent representations of attributes of the entity. For example, latent representations might not have been generated for skills of an entity. Hence, a one-hot embedding may be used to generate a feature vector for the entity.

Thus, a feature vector for an entity may be a concatenation of actual values of one or more attributes/features of the entity, latent representations of one or more other attributes/features of the entity, and/or hot encodings of one or more attributes/features of the entity.

A neighborhood feature vector for a set of entities (that are neighbors of a target entity) are based on feature vectors for each entity in the set. The feature vectors of the individual entities are combined to generate a neighborhood feature vector. Combining or aggregating multiple feature vectors may involve summing or averaging the feature vectors. For example, all values in the first entry of the feature vectors are summed to compute a total for the first entry, all values in the second entry of the feature vectors are summed to compute a total for the second entry, etc. As another example, all the values of the first entry of the feature vectors are averaged to compute an average for the first entry, all the values of the second entry of the feature vectors are averaged to compute an average for the second entry, etc. Aggregation operations other than summing or averaging may be used, such as selecting the median, maximum, minimum, 75th quartile, 90th quartile, etc.

In an embodiment, a neighborhood feature vector of a particular entity is generated based on feature vectors of neighbors that are at different degrees of separation of the particular entity in the graph. For example, a neighborhood feature vector of an entity includes a feature vector of a first-degree neighbor of the entity and a feature vector of a second-degree neighbor of the entity. In an alternative embodiment, an aggregation is performed "per level"; e.g., feature vectors of first-degree neighbors are aggregated while feature vectors of second-degree neighbors are aggregated separately from the feature vectors of the first-degree neighbors.

The graph upon which the training data is based may be limited to connection data or user interaction data that was generated during a certain time period, such as the last fourteen days. For example, if a first entity did not cause a message to be transmitted to a second entity in the last N days, then the first entity is not connected to the second entity in the graph. However, if the first entity composed a message that was transmitted to a third entity in the last N days, then the graph is updated to cause the first entity to be connected to the third entity.

Training Data

Training data comprises multiple training instances. Each training instance comprises (1) a combined feature vector for a first entity, (2) a combined feature vector for a second entity, and (3) a label indicating whether the first entity is connected to the second entity in a graph (e.g., a '1' if the second entity is a neighbor of the first entity and a '0' if the second entity is not a neighbor of the first entity). One or more machine learning techniques use the training data to train an artificial neural network (ANN) (e.g., ANN 138) that comprises an input layer, one or more hidden layers, and an output layer. Each layer comprises multiple nodes or neurons and each node or neuron connects to one or more other nodes or neurons, where each connection is associated with a weight or function. The weights are initially random, but are "learned" automatically as the training instances are used to train the ANN.

Model Training

In training an artificial neural network (ANN) (e.g., ANN 138), weights connecting nodes or neurons in the ANN may be initialized to random numbers. During the training process, each weight is continuously modified until the weights "stabilize", such that the objective value that is being optimized stops significantly improving. Training may be performed in small batches and weights may be updated after each batch.

Figure 2:
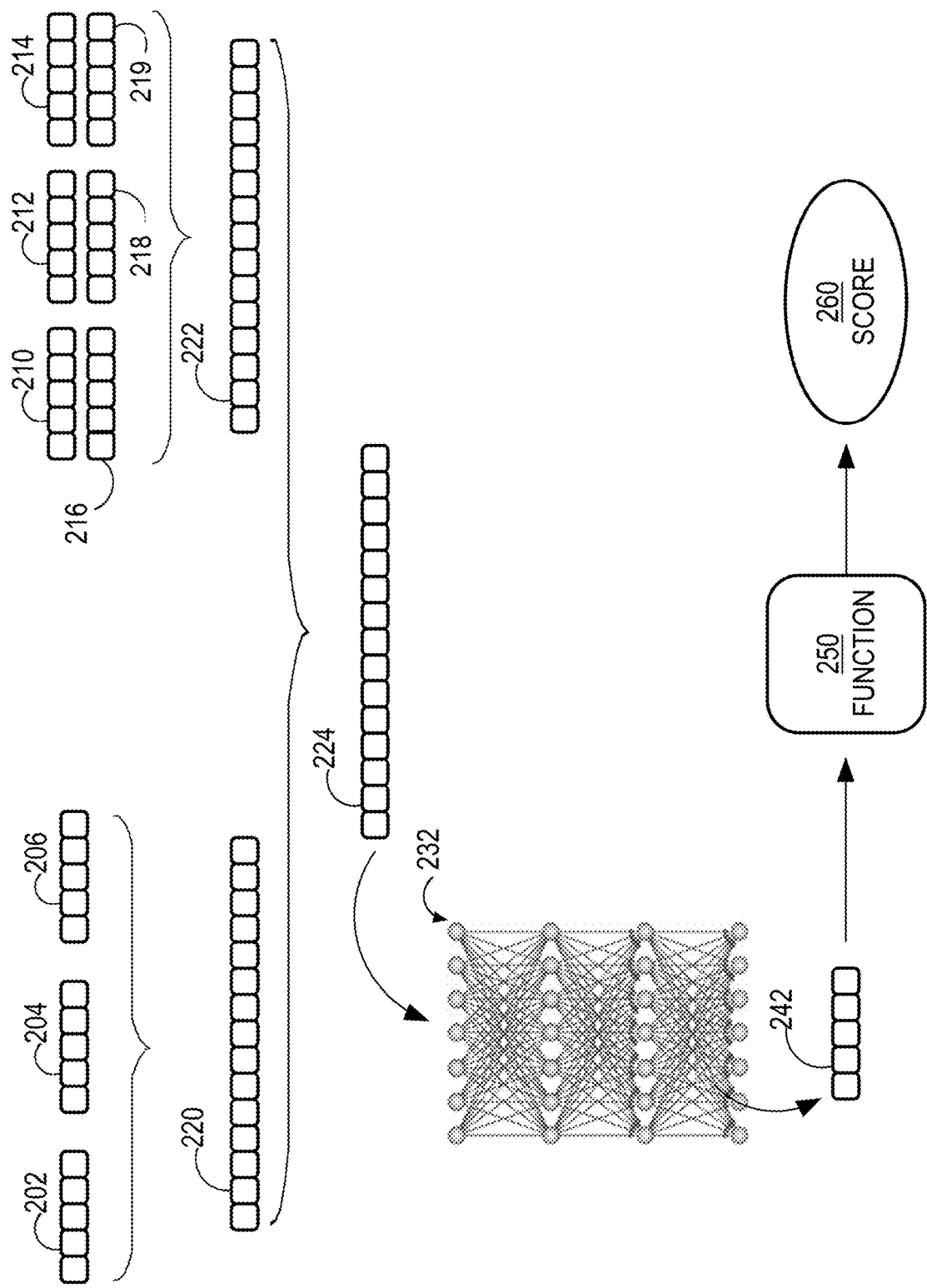
FIG. 2 is a block diagram that depicts an artificial neural network for generating latent representations for entities, in an embodiment.

FIG. 2 is a block diagram that depicts feature vectors and an ANN for generating latent representations for entities, in an embodiment. Feature vectors 202-206 are feature vectors for different attribute values of a first entity. Feature vector 202 corresponds to first attribute of the entity, feature vector 204 corresponds to a second attribute of the entity, and feature vector 206 corresponds to a third attribute of the entity. Although only three attributes/features are implied, an entity may have more or less attributes/features. As indicated above, some of the feature vectors may be the actual attribute values themselves, embeddings that have been machine-learned for the corresponding attribute values, or a hot encoding for the corresponding attribute values. For example, feature vector 202 may be an actual attribute value (e.g., an age or a number of years in a current job position), feature vector 204 may be an embedding for a skill, and feature vector 206 may be a hot encoding for a job industry.

Although feature vectors 202-206 are depicted as being vectors of size five, actual feature vectors may be vectors of any size, such as twenty. Also, feature vectors corresponding to different attributes may have different sizes. For example, feature vector 202 may be of size three while feature vector 204 may be of size ninety-five.

Feature vectors 210-214 are feature vectors for different attribute values of a first neighbor entity that is a neighbor of the first entity. Feature vectors 210-214 correspond to the same attributes, respectively, as the attributes to which feature vectors 202-206 correspond. Thus, feature vector 210 corresponds to the first attribute, feature vector 212 corresponds to the second attribute, and feature vector 214 corresponds to the third attribute. However, the values that feature vectors 210-214 may be very different than the values that feature vectors 202-206 represent. For example, feature vector 202 may be based on the first entity's job title being "Software Engineer" while feature vector 210 may be based on the first neighbor entity's job title being "Pet Sitter."

Similarly, feature vectors 216-219 are feature vectors for different attribute values of a second neighbor entity that is also a neighbor of the first entity. Feature vectors 216-219 correspond to the same attributes, respectively, as the attributes to which feature vectors 202-206 and feature vectors 210-214 correspond. Thus, feature vector 216 corresponds to the first attribute, feature vector 218 corresponds to the second attribute, and feature vector 219 corresponds to the third attribute. Although only two neighbors of the first entity are indicated in FIG. 2, an entity may have many more neighbors.

Feature vectors 202-206 may be combined (e.g., concatenated) to produce feature vector 220 for the first entity. Similarly, feature vectors 210-214 may be combined to produce a feature vector (not depicted) for the first neighbor entity and feature vectors 216-219 may be combined to produce another feature vector (not depicted) for the second neighbor entity.

The feature vectors of the first and second neighbor entities are combined or aggregated to generate a neighborhood feature vector 222. The feature vectors of the first and second neighbor entities are of the same size.

Feature vector 220 for the first entity is aggregated (e.g., concatenated) with neighborhood feature vector 222 of the neighbors of the first entity to produce aggregated feature vector 224.

Aggregated feature vector 224 is input to (an initially untrained) ANN 232, which outputs latent representation 242. The nodes or neurons of ANN 232 may be configured in many different ways. For example, the input layer of ANN 232 may be aggregated feature vector 224. A hidden layer of ANN 232 may be fully connected to the input layer and may comprise more, less, or the same number of neurons as the input layer. The hidden layer may be connected (fully or not) with an output layer. Alternatively, the hidden layer may be connected (fully or not) with another (second) hidden layer that is connected to the output layer. Additionally, another input layer corresponding to another aggregated feature vector (e.g., for neighbors of the neighbors of the first entity) may be connected (fully or not) to the second hidden layer.

Latent representation 242 and another latent representation (not depicted, but is also output by ANN 232) for another entity (that is different than the first entity) are input to function 250, which includes one or more operations. An output of function 250 is score 260, which indicates a similarity between the two entities. The higher score 260, the more likely the two entities are connected in the graph or that the two entities are will communicate with each other, or with otherwise interact with content authored or interacted with by the other entity. Once ANN 232 is trained, score 260 may be an actual probability, may be used to rank the content items, and/or may be used as a feature in another machine-learned model, depending on the downstream application The training process of ANN 232 involves gradient descent and backpropagation. Gradient descent is an iterative optimization algorithm for finding the minimum of a function; in this case, a loss function. Backpropagation is a method used in ANNs to calculate the error contribution of each neuron after a batch of data is processed. In the context of learning, backpropagation is used by a gradient descent optimization algorithm to adjust the weight of neurons (or nodes) in a neural network by calculating the gradient of the loss function. Backpropagation is also referred to as the "backward propagation of errors" because the error is calculated at the output and distributed back through the network layers. For models involving embeddings, there may be an implicit input layer that is often not mentioned. The embeddings may be a layer by themselves and backpropagation goes all the way back to the embedding layer. The input layer maps inputs to the embedding layer. Backpropagation begins at the final (output) layer and is applied per batch. Batch size depends on several factors, including the available memory on the computing device or GPU.

In an embodiment, a portion of the input layer corresponding to a particular attribute (e.g., industry of a user) is a hot encoding that comprises all zeros except for a single one value representing the attribute value.

After training, an aggregated feature vector for an entity (which vector may have been generated before the ANN is trained or after the ANN is trained) is input to the ANN. The output layer of the ANN produces a latent representation (or embedding) that is associated with the entity. The latent representation for the entity may be stored in (a) a mapping or table of multiple latent representations, one for each entity of multiple entities, or (b) account database 132 in association with an account of the entity.

Multiple Values for a Single Entity Attribute

In an embodiment, an entity is associated with multiple values of a particular attribute. For example, an entity might have been employed by multiple companies (whether concurrently or serially over time), might have multiple job titles (whether concurrently or serially over time), and might have multiple skills. When generating a feature vector for the entity, if the entity has multiple values of a particular attribute, then the feature vectors associated with the multiple values are combined before combining (e.g., concatenating) the combined feature vectors associated with that particular attribute with feature vectors associated with attribute values of other attributes.

For example, an entity has been employed by multiple employers over time and an embedding associated with each employer is identified. Each embedding is a vector comprising multiple ordered entries, each entry containing a real number. The maximum, average, median, or minimum of each entry relative to other entries in other embeddings of the same index is determined. For example, for a result embedding that is generated based on a set of embeddings of a particular attribute, the first entry in the result embedding will contain the maximum value of the first entries of the embeddings in the set of embeddings; the second entry in the result embedding will contain the maximum value of the second entries of the embeddings in the set of embeddings; the third entry in the result embedding will contain the maximum value of the third entries of the embeddings in the set of embeddings; and so forth. Such a process is referred to as "max pooling." A similar process may be performed where, instead of finding the maximum value, the median value or the mean value is computed for each entry in the result embedding.

As another example, an entity has graduated with multiple degrees. Each degree (e.g., Computer Science, Sociology) is associated with a different hot encoding. The hot encodings combined (e.g., added together) to produce a combined hot encoded. For example, combining three hot encodings results in a single hot encoding where three of the bits or entries has a '1' value.

Missing Embeddings

In some scenarios, a feature vector of an entity relies on an attribute for which an attribute value is missing for the entity. An attribute value might not be available if, for example, an embedding has not yet been learned for the attribute value or if the entity (or representative thereof) has not filled in that portion of an entity profile. For example, no embedding has yet been learned for a new attribute value that was created in the last day. As another example, a particular skill, job title, or employer may be new, in which case no embedding will have been learned for that attribute value.

In an embodiment, if no attribute value exists for an attribute value, then a random attribute may be generated. Alternatively, if the attribute value is known, but an embedding has not yet been generated for the attribute value, then embeddings of other (e.g., related) attribute values may be combined (e.g., averaged, median determined, or maximum determined) to generate a combined embedding. The combined embedding is used for the new attribute value until a machine-learned embedding is generated for the new attribute value. The combined embedding is then combined (e.g., concatenated) with feature vectors of one or more other attribute values of the entity to generate a feature vector for the entity.

For example, if a missing embedding is for a new job title, then embeddings of job titles that are considered similar to the new job title may be combined. A similar job title may be one that has similar words or meanings as the new job title. A similar process for new skills may be followed.

In a related embodiment, if an attribute value of an entity is missing for a particular attribute, then embeddings of the particular attribute for one or more connections of the entity are used (e.g., averaged, median determined) to determine an embedding for the particular attribute for the entity.

In some scenarios, a user might not fill in his/her profile with sufficient information, such that one or more attribute values of an entity (whether the user itself or another entity that the user represents) are missing. For example, a user might not specify any skills (or might specify very few skills) in her profile. Skills of the user may be inferred by determining the most frequently specified skills in profiles of users (a) with the same job title, (b) at the same employer, and/or (c) who are connected to the user in a social network. The top N (e.g., two or three) of those skills are associated with the user (though not included in the user's profile) and embeddings of those top N skills are retrieved and user to generate a user-level embedding for the skill attribute.

As another example, a user might not specify an industry in his/her profile. An industry of the user may be inferred by determining the most common specified industry in profiles of users (a) with the same job title, (b) at the same employer, and/or (c) who are connected to the user in a social network. The top N (e.g., one, two, or three) of those industries are associated with the user (though not included in the user's profile) and embeddings of those top N industries are retrieved and used to generate an embedding for the industry attribute.

Neighbors of Arbitrary Depth

The neighbors (or neighborhood) of an entity may be determined in one or more ways. In an embodiment, a neighborhood of an entity includes neighbors who are only one degree a separation away from the entity as indicated in a (e.g., connection) graph. Thus, in the graph, the entity is directly connected to each of the neighbors.

In a related embodiment, a neighborhood of an entity includes neighbors who are two or more degrees of separation away from the entity as indicated in a graph. For example, entity A is connected to entity B and entity B is connected to entity C, which is not connected to entity A. Thus, entity C is a neighbor of entity A. Accordingly, a combined feature vector for entity A is based on a feature vector of entity B and a feature vector of entity C.

For example, in a second-degree embodiment, a combined feature vector of an entity is based on combined feature vector of each neighbor of the entity, where the combined feature vector of each neighbor is based on a feature vector of each neighbor of that neighbor.

Filtering Neighbors

In an embodiment, not all neighbors of an entity are considered when generating a combined feature vector for the entity. Different criteria may be used to select which neighbors of the entity will be considered as neighbors. For example, only neighbors that have an embedding for each applicable attribute value are considered. Thus, if a neighbor is missing an embedding for one of the N attribute values, then that neighbor is not considered when training the ANN (and/or in computing a final latent representation for a target entity).

As another example, neighbors are randomly selected, especially for entities that have many (e.g., hundreds of) neighbors. As another example, neighbors (of an entity) with fewer than N connections (or have performed less than M actions of a particular type) are removed from consideration as neighbors of the entity.

As another example, neighbors (of an entity) that have a similarity score with the entity below a certain threshold are removed from consideration. The similarity score may be generated by a rule-based model or a machine-learned model. For example, a count of the number of attribute values in common between the entity's profile and a neighbor's profile may be computed and used as a similarity score. Some profile attributes may be associated with a higher weight than other profile attributes.

As another example, only neighbors with which an entity has interacted (e.g., sent or received a message; liked, commented, or shared a content item authored by the neighbor or vice versa (i.e., the neighbor liked, commented, or shared a content item authored by the entity); interacted with a notification associated with the neighbor or vice versa) are considered neighbors of the entity. All other neighbors are not considered, for purposes of generating a combined feature vector for the entity.

Example Process

Figure 3:
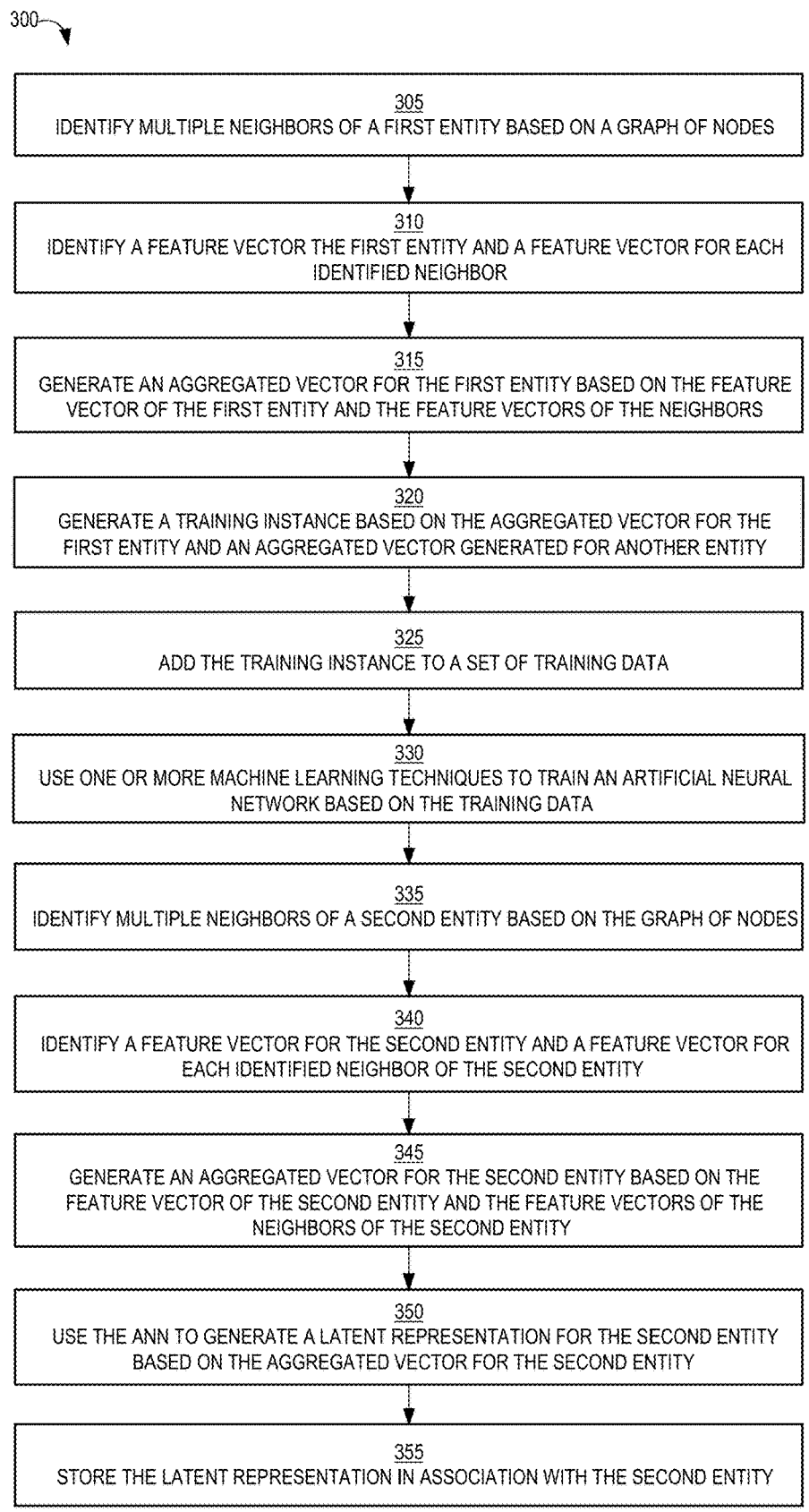
FIG. 3 is a flow diagram that depicts an example process for generating latent representations for entities, in an embodiment.

FIG. 3 is a flow diagram that depicts an example process 300 for generating latent representations for entities, in an embodiment. Process 300 may be performed by different components of server system 130.

At block 305, multiple neighbors of a first entity are identified based on a graph of nodes. The neighbors of the first entity may be first-degree neighbors of the entity only. Alternatively, the neighbors of the first entity may include second-degree (and/or third-degree) neighbors of the entity. Block 305 may be performed by feature vector aggregator 134 or another component of server system 130. Block 305 may involve identifying an account of the first entity in account database 132 and identifying, within the account, a list of connections (or neighbors) of the first entity. If the graph is based on messaging or another type of interaction, then an entity's account may list entities (a) with which the entity interacted and/or (b) that have interacted with the entity.

At block 310, a feature vector is identified for each identified neighbor and for the first entity. Block 310 may involve identifying, for each entity (whether the first entity or a neighbor of the first entity), features of the entity and concatenating those features to generate a feature vector for the entity. Some of the features may real numbers (such as age or length of time in a current job position), while other features may be converted into real numbers (such as geographic location, a job title, and an employer name). Latent representations (or embeddings) may have already been learned for those features, or the feature values of those features may be reflected in a hot encoding.

At block 315, an aggregated vector is generated for the first entity based on the feature vector of the first entity and the feature vectors of the neighbors. Block 315 may be performed by feature vector aggregator 134. Block 315 may involve aggregating the feature vectors of the neighbors so that the result is the same size as a single feature vector for a single neighbor and then concatenating that aggregated neighbor feature vector with the feature vector of the first entity.

At block 320, a training instance is generated based on the aggregated vector for the first entity and an aggregated vector generated for another entity. The aggregated vector for the other entity may be generated according to technique outlined in blocks 305-315. A label for the training instance may be a '1' indicating that the two entities are neighbors in the graph (making the training instance a "positive" training instance) or a '0' indicating that the two entities are not neighbors in the graph (making the training instance a "positive" training instance). Block 320 may involve generating a certain percentage of positive training instances or negative training instances. For example, 50% of the training instances are ensured to be positive training instances. Block 320 may be performed by model generator 136 or another component of server system 130.

At block 325, the training instance is added to a set of training data. Blocks 305-325 is repeated for multiple entities.

At block 330, one or more machine learning techniques are used to train an artificial neural network based on the set of training data. Block 330 may involve using one portion of the set of training data for training the ANN and another portion of the set of training data for validating the ANN to determine precision and accuracy of the ANN. Block 330 may be performed by model generator 136.

At block 335, multiple neighbors of a second entity are identified based on the graph of nodes. The second entity may be the same as (or different than) one of the entities for which a training instance was generated. Block 335 is similar to block 305. For example, block 335 may be performed by feature vector aggregator 134.

At block 340, a feature vector is identified for each identified neighbor and for the second entity. Block 340 is similar to block 310. For example, block 340 may be performed by feature vector aggregator 134.

At block 345, an aggregated vector is generated for the second entity based on the feature vector of the second entity and the feature vectors of the neighbors of the second entity. Block 345 is similar to block 315. For example, block 340 may be performed by feature vector aggregator 134.

At block 350, the ANN is used to generate a latent representation for the second entity based on the aggregated vector for the second entity.

At block 355, the latent representation (or embedding) is stored in association with the second node.

Blocks 335-355 may be repeated for multiple entities, at least some of which may be different than the entities upon which the ANN is based.

Example Uses for Latent Representations

A latent representation for an entity may be used in multiple ways. For example, a first latent representation for a first entity and a second latent representation for a second entity are input to an operation to determine whether to send, to the first entity, certain content associated with the second entity. The operation may be a cosine similarity operation, which is a measure of similarity between two non-zero vectors of an inner product space that measures the cosine of the angle between them. Other operations that may be used to determine similarity of two vectors include Euclidean distance, Manhattan distance, and Minkowski distance.

The more similar two latent representations of different entities are, the more likely that one entity would be interested in content associated with (or in interacting with) the other entity. For example, a similarity measure of two latent representations of two different entities may be used to rank content associated with one entity before presenting the ranked content to the other entity. As another example, a similarity measure of two latent representations of two different entities may be used to rank a candidate content item associated with one entity relative to other candidate content items before presenting any of the candidate content items to the other entity.

As a specific example, in determining which candidate entities to present to a particular entity as entities the particular entity might know and with whom the particular entity can create an online social connection, multiple similarity measures are generated, each based on a latent representation of the particular entity and a latent representation of one of the candidate entities. A similarity measure is a feature of a machine-learned model, which computes a score for each candidate entity relative to the particular entity. The machine-learned model may be based on multiple other features, such as whether two entities share any connections in common, whether the two entities work or have worked for the same employer in the past, whether the two entities attended the same school, whether the two entities share the same job title, etc. The score of each candidate entity is used to rank the candidate entities. Content associated with the highest ranked candidate entities (e.g., name, profile picture, job title) are presented on a computing device of the particular entity or at least presented to the particular entity in an order indicated by the ranking.

As another example, in determining which candidate content items to present to a particular entity in an electronic (e.g., social media) feed of the particular entity, multiple similarity measures are generated, each based on a latent representation of the particular entity and a latent representation of (a) an author one of the candidate content items or (b) an entity that interacted with (e.g., liked, shared, commented on) one of the candidate content items (or "interactor"). The similarity measure is a feature of a machine-learned model, which computes a score for each candidate content item. The machine-learned model may be based on multiple other features, such as whether the particular entity and the author/interactor share any connections in common, etc. The score of each candidate content item is used to rank the candidate content items. The highest ranked candidate content items are presented on a computing device of the particular entity or at least presented to the particular entity in an order indicated by the ranking.

As another example, in determining which candidate notifications to present to a particular entity, multiple similarity measures are generated, each based on a final embedding of the particular entity and a latent representation of an entity that is associated with activity that triggered a candidate notification. Examples of activities include changing employers, starting a new position within the same organization, experiencing a work anniversary, sharing a post, and viewing a public profile of the particular entity. The similarity measure is a feature of a machine-learned model, which computes a score for each candidate notification. The machine-learned model may be based on multiple other features, such as whether the particular entity and the other entity share any connections in common, etc. The score of each candidate notification is used to rank the candidate notifications. The top N highest ranked candidate notifications are presented on a computing device of the particular entity.

As another example, some content delivery systems allow users to not only view a content item (e.g., an article), but also specify comments that are associated with the content item, which comments are then presented to other viewers of the content item. However, for some content items, there are so many comments associated with a content item that not all the comments can be presented on a computer screen at once. Therefore, the content delivery system much choose which comments to display to a current viewer of the content item or of the comments thereof. In an embodiment, similar to notifications and feed items, a latent representation of a viewer of a content item is computed (e.g., in real-time or prior to the viewer selecting the content item). Also, latent representations of authors of comments associated with the content item are identified. A similarity measure is computed for each pair of latent representations; each pair consisting of the latent representation of the viewer and a latent representation of an author of a comment. The similarity measure of each pair is used to rank or select comments for presentation to the viewer.

As another example, many content delivery systems suffer from fraudulent users. In an online social context, a person might create a bot that creates multiple fake accounts, which are then used to spam content to other users in the online network. Given one or more known fake accounts, a latent representation is generated based on attributes of the fake account and neighbors of the fake account in according to a graph. With this latent representation, similarity measures may be computed based on latent representations of other known fake accounts and other unknown fake accounts. If, for example, the similarity measure between a known fake account and an unknown fake account is within a certain threshold (which may be based on similarity measures between known fake accounts), then the unknown fake account may be considered a fake account or at least marked for further analysis.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
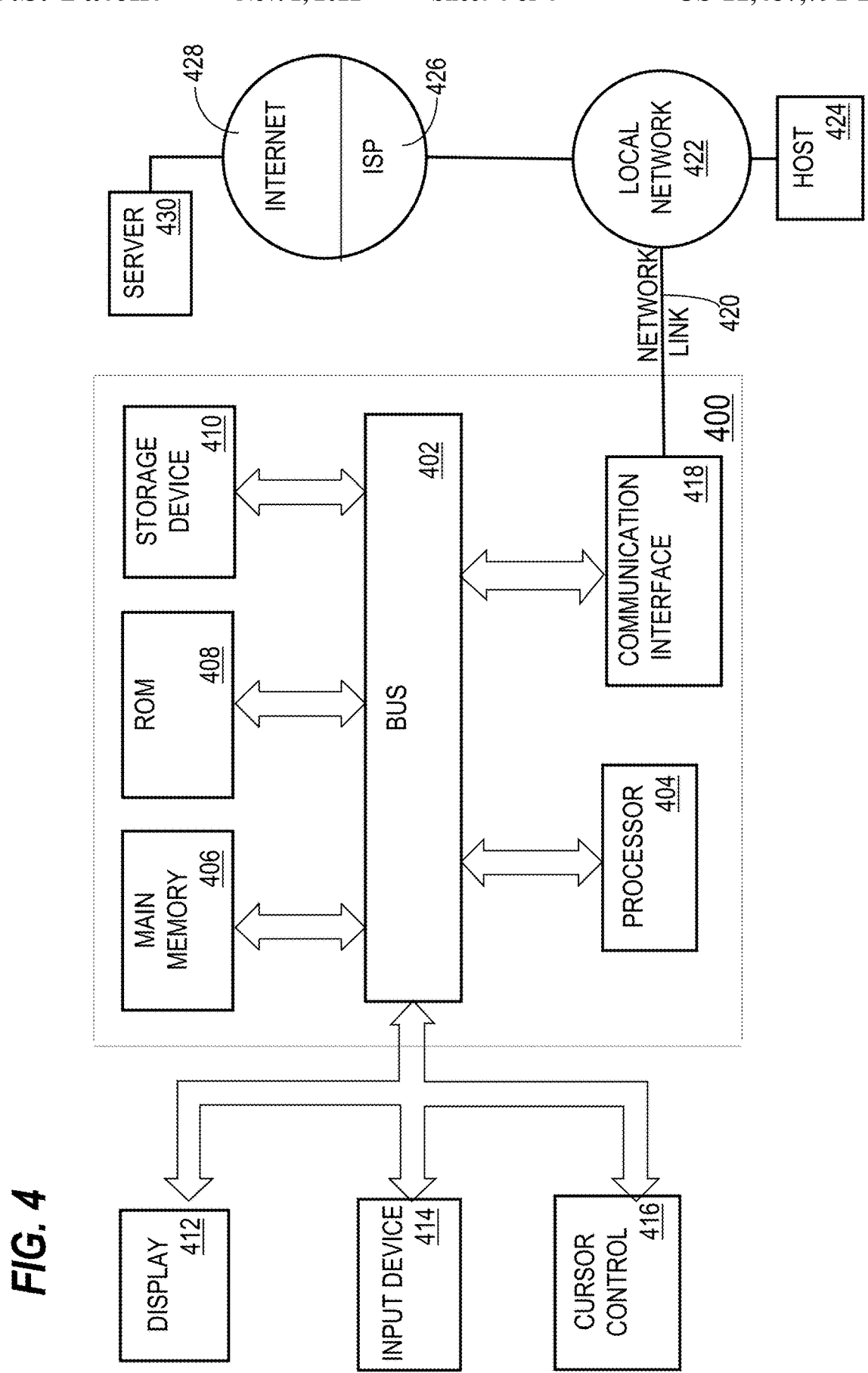
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   for a first particular node of a first plurality of nodes in a graph of affinities between at least one of people and organizations:
     identifying a first plurality of neighbor nodes that are within N connections of the first particular node in the graph, where N is a positive integer less than or equal to 3;
     identifying a first plurality of feature vectors that represent attribute values of a first particular neighbor node of the first plurality of neighbor nodes;
     identifying a first feature vector of the first particular node;
     generating a first aggregated vector for the first particular node by aggregating the first feature vector and the first plurality of feature vectors;
     generating a training instance that comprises the first aggregated vector, a second aggregated vector generated for a second particular node of the first plurality of nodes that is different than the first particular node, and a label indicating whether the first particular node and the second particular node are neighbors in the graph;
     adding the training instance to a set of training data;
   training an artificial neural network based on the set of training data including the training instance;
   for a second particular node of a second plurality of nodes in the graph:
     identifying a second plurality of neighbor nodes of the second particular node;
     identifying a second plurality of feature vectors, each corresponding to a different neighbor node of the second plurality of neighbor nodes;
     identifying a second feature vector of the second particular node;
     generating a third aggregated vector based on the second feature vector and the second plurality of feature vectors;

using the trained artificial neural network, generating an embedding based on the third aggregated vector and the training instance;

storing the embedding in association with the second particular node;

wherein the method is performed by one or more computing devices.

2. The method of claim 1, further comprising:

making a determination of whether the first particular node of the first plurality of nodes is connected to said other node in the graph;

including, in the label of the training instance, a label value that is based on the determination.

3. The method of claim 1, wherein the first plurality of neighbor nodes of the first particular node comprises nodes that are two or more degrees of separation away, in the graph, from the first particular node.

4. The method of claim 1, wherein the first feature vector of the first particular node is based on a plurality of attributes.

5. The method of claim 4, wherein the plurality of attributes includes two or more of skills, academic institution, employer, geolocation, or job title.

6. The method of claim 1, further comprising:

analyzing an online social graph to generate the graph, wherein an edge that connects two nodes in the graph represents an online connection between entities represented by the two nodes.

7. The method of claim 1, further comprising:

analyzing a messaging log to generate the graph, wherein an edge that connects two nodes in the graph represents a message that was (a) composed by an entity of two entities, the entity represented by one of the two nodes and (b) sent to an other entity of the two entities, the other entity represented by the other of the two nodes.

8. The method of claim 1, further comprising:

analyzing an online interaction log to generate the graph, wherein an edge that connects two nodes in the graph represents an online interaction by (a) an entity of two entities, the entity represented by one of the two nodes with (b) content that is associated with an other entity of the two entities, the other entity represented by the other of the two nodes.

9. The method of claim 1, further comprising:

inputting a feature value into a machine-learned model to compute a score for a first entity that is represented by the first particular node of the second plurality of nodes;

wherein the feature value is based on the embedding of the first particular node of the second plurality of nodes;

wherein the score is based on a second embedding that was generated for a second entity that is different than the first entity;

based on the score, determining whether to present, on a computing device of the second entity, first content that is associated with the first entity.

10. One or more non-transitory storage media storing instructions which, when executed by one or more processors, cause:

for a first particular node of a first plurality of nodes in a graph of affinities between at least one of people and organizations:

identifying a first plurality of neighbor nodes that are within N connections of the first particular node in the graph, where N is a positive integer less than or equal to 3;

identifying a first plurality of feature vectors that represent attribute values of a first particular neighbor node of the first plurality of neighbor nodes;

identifying a first feature vector of the first particular node;

generating a first aggregated vector for the first particular node by aggregating the first feature vector and the first plurality of feature vectors;

generating a training instance that comprises the first aggregated vector, a second aggregated vector generated for a second particular node of the first plurality of nodes that is different than the first particular node, and a label indicating whether the first particular node and the second particular node are neighbors in the graph;

adding the training instance to a set of training data;

training an artificial neural network based on the set of training data including the training instance;

for a second particular node of a second plurality of nodes in the graph:

identifying a second plurality of neighbor nodes of the second particular node;

identifying a second plurality of feature vectors, each corresponding to a different neighbor node of the second plurality of neighbor nodes;

identifying a second feature vector of the second particular node;

generating a third aggregated vector based on the second feature vector and the second plurality of feature vectors;

using the trained artificial neural network generating an embedding based on the third aggregated vector and the training instance; and storing the embedding in association with the second particular node.

11. The one or more non-transitory storage media of claim 10, wherein the instructions, when executed by the one or more processors, further cause:

making a determination of whether the first particular node of the first plurality of nodes is connected to said other node in the graph;

including, in the training instance, a label value that is based on the determination.

12. The one or more non-transitory storage media of claim 10, wherein the first plurality of neighbor nodes of the first particular node comprises nodes that are two or more degrees of separation away, in the graph, from the first particular node.

13. The one or more non-transitory storage media of claim 10, wherein the first feature vector of the first particular node is based on a plurality of attributes.

14. The one or more non-transitory storage media of claim 13, wherein the plurality of attributes includes two or more of skills, academic institution, employer, geolocation, or job title.

15. The one or more non-transitory storage media of claim 10, wherein the instructions, when executed by the one or more processors, further cause:

analyzing an online social graph to generate the graph, wherein an edge that connects two nodes in the graph represents an online connection between entities represented by the two nodes.

16. The one or more non-transitory storage media of claim 10, wherein the instructions, when executed by the one or more processors, further cause:

analyzing a messaging log to generate the graph, wherein an edge that connects two nodes in the graph represents a message that was (a) composed by an entity of two entities, the entity represented by one of the two nodes and (b) sent to an other entity of the two entities, the other entity represented by the other of the two nodes.

17. The one or more non-transitory storage media of claim 10, wherein the instructions, when executed by the one or more processors, further cause:
- analyzing an online interaction log to generate the graph, wherein an edge that connects two nodes in the graph represents an online interaction by (a) an entity of two entities, the entity represented by one of the two nodes with (b) content that is associated with an other entity of the two entities, the other entity represented by the other of the two nodes.

18. The one or more non-transitory storage media of claim 10, wherein the instructions, when executed by the one or more processors, further cause:
- inputting a feature value into a machine-learned model to compute a score for a first entity that is represented by the first particular node of the second plurality of nodes;
- wherein the feature value is based on the embedding of the first particular node of the second plurality of nodes;
- wherein the score is based on a second embedding that was generated for a second entity that is different than the first entity;
- based on the score, determining whether to present, on a computing device of the second entity, first content that is associated with the first entity.

19. A system comprising:
- one or more processors;
- one or more storage media storing instructions which, when executed by the one or more processors, cause:
  - generating a first aggregated feature vector for a first entity by aggregating a first feature vector of the first entity and first feature vectors of entities that are neighbor entities of the first entity in a graph of affinities between at least one of people and organizations;
  - wherein the neighbor entities are within N connections of the first entity in the graph, where N is a positive integer less than or equal to 3;
  - wherein the first feature vectors represent attribute values of a different neighbor entity of the first plurality of neighbor entities;
  - generating, using a machine-learned model, a first latent representation of the first entity based on the first aggregated feature vector;
  - generating a second aggregated feature vector for a second entity based on a second feature vector of the second entity and second feature vectors of entities that are neighbor entities of the second entity in the graph;
  - generating, using the machine-learned model, a second latent representation of the second entity based on the second aggregated feature vector; and
  - comparing the first latent representation with the second latent representation.

20. The system of claim 19, wherein the instructions, when executed by the one or more processors, further cause:
- based on a similarity between the first latent representation and the second latent representation, determining which content to transmit to a computing device of the first entity.

* * * * *